United States Patent [19]

Dong

[11] Patent Number: 5,297,186
[45] Date of Patent: Mar. 22, 1994

[54] DEVICE AND METHOD FOR ON-LINE ADAPTIVE SELECTION OF BAUD RATE AND CARRIER FREQUENCY

[75] Inventor: Ping Dong, No. Quincy, Mass.

[73] Assignee: Codex Corporation, Mansfield, Mass.

[21] Appl. No.: 736,859

[22] Filed: Jul. 29, 1991

[51] Int. Cl.$^5$ .............................................. H04L 23/00
[52] U.S. Cl. ..................................... 375/121; 375/10; 375/13; 455/226.3
[58] Field of Search .................... 375/10, 7, 8, 13, 75, 375/77, 121, 97, 118; 370/84; 455/62, 63, 67.3, 226.1, 226.3; 364/725, 726

[56] References Cited

U.S. PATENT DOCUMENTS

| | | | |
|---|---|---|---|
| 4,310,721 | 1/1982 | Manley et al. | 375/8 |
| 4,756,007 | 7/1988 | Qureshi et al. | 375/8 |
| 4,817,114 | 3/1989 | Boer et al. | 375/8 |
| 4,956,851 | 9/1990 | Wolensky et al. | 375/8 |
| 5,031,193 | 7/1991 | Atkinson et al. | 375/13 |
| 5,048,054 | 9/1991 | Eyuboglu et al. | 375/8 |

*Primary Examiner*—Stephen Chin
*Assistant Examiner*—Young Tse
*Attorney, Agent, or Firm*—Darleen J. Stockley

[57] ABSTRACT

Optimal baud rate and carrier frequency for data transmission using a modem on a communication channel (100) are determined by utilizing an on-line line probing technique. The technique utilizing the information from a decoder noise power spectrum estimated from the equalized received modulated signals and decoder output symbols to determine the decoder signal-to-noise ratios (SNRs) and supported bit rates for the available baud rates and carrier frequencies. These SNRs and bit rates together with a band edge SNR difference at each frequency band are utilized to select (110) the optimal baud rate and carrier frequency.

42 Claims, 1 Drawing Sheet

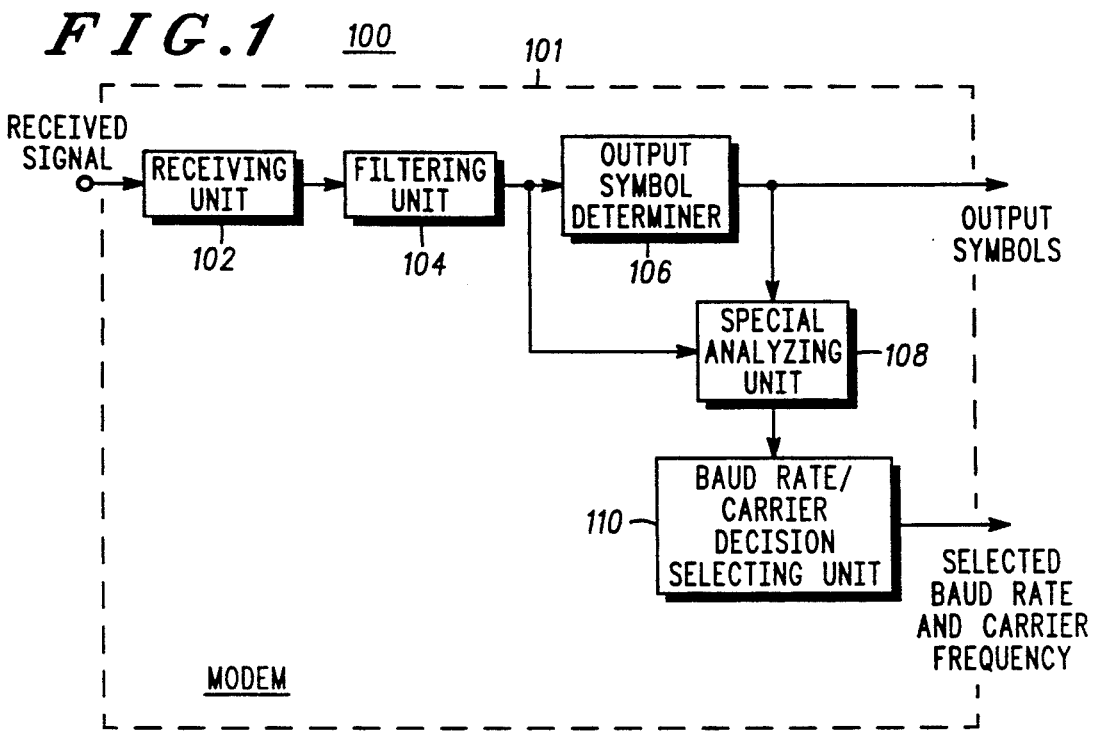
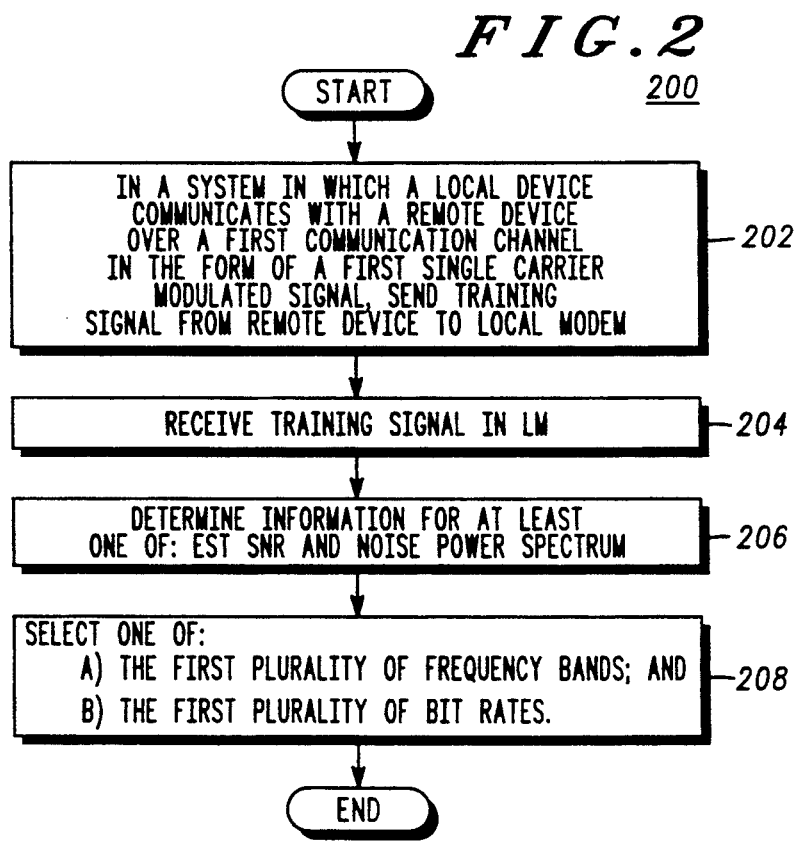

DEVICE AND METHOD FOR ON-LINE ADAPTIVE SELECTION OF BAUD RATE AND CARRIER FREQUENCY

CROSS-REFERENCE TO RELATED APPLICATION

This application is related to the U.S. Pat. No. 5,048,054: Line Probing Modem; Vedat Eyuboglu and Ping Dong, Inventors; Codex Corporation, Assignee; Filed May 12, 1989.

FIELD OF THE INVENTION

The present invention relates generally to modems, and more particularly, to selection of channel characteristics of modems.

BACKGROUND OF THE INVENTION

A data transmission system typically utilizes modems, a first modem typically implementing a modulation process to convert a digital bit stream into an analog signal and transmitting the modulated signal over a communication channel, and a second modem receiving and demodulating that signal to retrieve the communicated digital bit stream. The modulation process typically implements a carrier system having at least a first carrier signal and a first baud rate. Data transmission, particularly over long distance circuits, generally experiences different channel variations and impairments. To achieve optimum performance over a wide variety of channels, the modem has to be able to adapt its baud rate and carrier frequency to best suit a particular channel connection condition.

The baud rate and carrier frequency adaptation can be achieved using off-line probing. In a typical off-line line probing, data transmission is stopped, and a remote modem transmits a predetermined signal. Both channel frequency response and noise power spectrum are measured to form a signal-to-noise ratio (SNR) spectrum. This SNR spectrum is used to determine an equalizer noise power spectrum and a corresponding decoder SNR at each baud rate and carrier frequency combination. The decoder SNR and other receiver parameters such as signal level, etc., are then used to determine a maximum bit rate each baud rate and carrier frequency combination can support. The baud rate and carrier frequency combination that can support the maximum bit rate is an optimum baud rate and carrier frequency. Generally, if precoding or trellis precoding is used in the data transmission, a corresponding precoding gain may also be determined from the equalizer noise power spectrum, and is reflected in the decoder SNR. Remaining operations in baud rate and carrier frequency selection are the same with or without precoding.

However, off-line line probing has certain drawbacks. Off-line line probing is intrusive, needing dedicated line-probing time and a line probing signal. Off-line line probing sometimes may not predict a modem performance accurately due to the fact that line probing and data transmission use different signals and different compensation algorithms for phase and magnitude jitter compensation, non-linear distortion adjustment, echo cancellations, and so forth. There is a need for a modem having an on-line device and method that alleviates at least some of the problems cited.

SUMMARY OF THE INVENTION

A device and method for a modem capable of utilizing at least one baud rate/carrier frequency in a transmitter and a receiver, for at least receiving at least a single carrier modulated signal for information transmitted from a remote device, the remote device being capable of utilizing at least one baud rate/carrier frequency in a transmitter and a receiver, over at least a first communication channel, comprising at least: a receiving unit, operably coupled at least to the first communication channel, for receiving the modulated signal and for receiving a training signal transmitted by the remote device over any one of a plurality of frequency bands; a filtering unit, operably coupled to the receiving unit, for at least providing a demodulated equalized received signal; an output symbol determiner, operably coupled to the filtering unit, for at least determining output symbols for the equalized received modulated signal; a spectrum analyzing unit, operably coupled to the filtering unit and to the output symbol determiner, for at least utilizing the equalized received modulated signals and the output symbols to determine information for estimating at least one of: a signal-to-noise ratio (SNR) spectrum and a noise power spectrum and a baud/carrier decision selecting unit, operably coupled at least to the spectrum analyzing unit, for utilizing information for estimating at least one of: decoder signal-to-noise ratios (SNRs), maximum supported bit rates, and SNRs at band edges for at least some of the available baud rate and carrier frequency combinations to provide adaptive selection of a desired baud rate and carrier frequency selection in a data communication channel.

BRIEF DESCRIPTION OF THE DRAWINGS

FIG. 1 is a general block schematic diagram of a first embodiment of a device for adaptively selecting baud rate/carrier frequency over at least a first communication channel in accordance with the present invention.

FIG. 2 is a flow chart diagram that illustrates a first embodiment of the steps of the method of the present invention.

DETAILED DESCRIPTION OF A PREFERRED EMBODIMENT

The present invention remedies at least some of the problems cited above, eliminating a necessity for off-line line probing, thus saving in time, being efficient and less complex, requiring only that a noise spectrum be measured, and being accurate in modem performance estimation at the highest baud rate since the on-line configuration of the present invention automatically adjusts for on-line variations such as echo cancellation and jitter compensation. FIG. 1, numeral 100, illustrates a general block schematic diagram of a first embodiment of a device for adaptively selecting baud rate/carrier frequency over at least a first communication channel in accordance with the present invention, typically in a modem. The device of the present invention comprises a modem (101) for at least receiving at least a single carrier modulated signal for information transmitted from a remote device over at least a first communication channel, comprising at least: a receiving unit (102), operably coupled at least to the first communication channel, for receiving the modulated signal and for receiving a training signal transmitted by the remote device over any one of a plurality of frequency bands; a filtering unit (104), operably coupled to the receiving unit (102), for at least providing a demodulated equalized received signal; an output symbol determiner (106), operably coupled to the filtering unit (104), for at least determining output symbols for equalized received modulated signals; a spectrum analyzing unit (108), operably coupled to the filtering unit (104) and to the output symbol determiner (106), for at least utilizing the equalized received modulated signals and the output symbols to determine information for estimating a signal-to-noise ratio (SNR) spectrum; and a baud/carrier decision selecting unit (110), operably coupled at least to the spectrum analyzing unit (108), for utilizing information for estimating at least one of: decoder signal-to-noise ratios (SNRs), maximum supported bit rates, and SNRs at band edges for at least some of the available baud rate and carrier frequency combinations to provide adaptive selection of a desired baud rate and carrier frequency selection in a data communication channel. The preferred embodiment typically utilizes a full-duplex type modem, but it is understood that this invention could also be carried out using a half-duplex modem wherein data transmissions are sequential rather than concurrent.

In the preferred embodiment, a remote device, typically a remote modem, transmits a signal at a highest available baud rate over a first communication channel, and receives information from a local device, typically a local modem, over a second communication channel.

The local modem, receiving at the same highest baud rate, includes a receiving unit (102) for, as desired, filtering, utilizing gain control, and converting a received modulated signal to a digital signal. The filtering unit (104), typically having at least an adaptive filter and a demodulator, determines at least a demodulated, equalized received signal. An output symbol determiner (106), typically a decoder, determines output symbols for the received signal as is known in the art. The spectrum analyzing unit (108) obtains a difference between the demodulated, equalized received signal and the output symbols to form an error sequence, then uses the error sequence to find an equalizer noise power spectrum, typically using discrete Fourier transform (DFT). When the equalizer noise power spectrum is obtained at the highest available baud rate $Q_0$ and a suitable carrier frequency $f_0$ such that the equalizer noise power spectrum spectral span covers frequency bands for substantially all possible baud rate and carrier frequency combinations, the information obtained is substantially the same as that obtained from an off-line line probing that provides an equalizer noise power spectrum. Specifically when the equalizer noise power spectrum at the highest available baud rate $Q_0$ is $\Phi(f)$, covering frequency bands for substantially all possible baud rate and carrier frequency combinations, then the equalizer noise power spectrum for an i-th baud rate and j-th carrier frequency is:

$$\Phi_{ij}(f) = Q_i/Q_0 \Phi(f), \ |f + f_0 - f_j| < Q_i/2.$$

A noise correlation sequence for that baud rate and carrier frequency is generally computed substantially as:

$$g_n =$$

-continued $$\frac{1}{Q_0} \int_{|f+f_0-f_j|<Q_i/2} \Phi(f) \exp(j2\pi n(f+f_0-f_j)/Q_i) df.$$

$n = 0, 1, 2, \ldots .$

Since the decoder input signal power spectrum $S_{ij}(f)$ at the i-th baud rate and j-th carrier frequency is typically known or can be computed directly from an output of the output symbol determiner (106), the decoder SNR spectrum $SNR_{ij}(f)$ at the same baud rate and carrier frequency is substantially related to the decoder noise power spectrum $\Phi_{ij}(f)$ in the following way:

$$SNR_{ij}(f) = S_{ij}(f)/\Phi_{ij}(f), \ |f+f_0-f_j| < Q_i/2.$$

Where no precoding is utilized, $g_0$ provides the equalizer noise power that is also the decoder noise power for the selected baud rate and carrier frequency combination. Where precoding is utilized, the decoder noise power is typically determined utilizing well-known formulas for linear prediction theory. Decoder signal power being known, the decoder SNR is determined from the decoder noise power. A maximum supported bit rate is then typically determined for each baud rate and carrier frequency as in off-line line probing, and a combination that supports the highest bit rate provides an optimal baud rate and carrier frequency.

The method described above is functional where substantially all desired frequency bands are within a frequency span of a current baud rate and carrier frequency. Where such is not the case, the following alternative method is utilized to determine the baud rate and carrier frequency.

Where, for a carrier frequency other than the current frequency at current baud rate, at least one part of a frequency band is not visible, the noise power spectrum alone does not predict performance of the modem when a carrier frequency is changed. However, most communication channels' SNR deteriorates for frequency band away from a center. Thus, a best carrier frequency, one that minimizes the decoder noise power, typically has roughly equal noise power spectrum density at its two band edges. Where a noise power spectrum of the two band edges is significantly different, for example, larger than a selected threshold, then a change in carrier frequency is provided to improve the modem's performance.

Determination of the modem's performance for a higher baud causes a similar difficulty as that just described since part of the frequency baud for the higher frequency is not visible. For most voice band modem applications, a channel SNR deteriorates towards the band edges only at a limited rate, limiting an increase in noise power from the current baud rate to a next higher baud rate. A hard threshold is generally selected for determining whether or not to select the next higher baud rate. For example, where band edges in a current baud rate have a noise enhancement of no more than 5 dB, the next higher baud rate would be selected. The band edge method can only provide improvement; however, several adjustments may be needed to reach the optimal baud rate and carrier frequency.

It will be noted that in some cases a modem must be able to fall back to a former, or alternatively, a preset, baud rate and carrier frequency where, having selected at least one of a higher baud rate and carrier frequency, the channel cannot support the selected baud rate and/or the selected carrier frequency, or alternatively, external constraints disallow at least one of the modem's selected baud rate and carrier frequency.

In some modem implementations, a channel may be unable to support the highest baud rate determined as described above, as for example, where there is inadequate timing recovery. In such a case a fall-back baud rate and carrier frequency is typically predetermined. An originally chosen highest baud rate and carrier frequency is typically called a default baud rate and carrier frequency. Where a remote modem receives no indication that a local modem has been successfully trained at the default baud rate and carrier frequency before a predetermined time out, the remote modem typically sends a training signal at the fall-back baud rate and carrier frequency. Thus, the local modem is generally equipped to detect the training signal at both the default and fall-back baud rate and carrier frequency.

The modulated signal is typically a linearly modulated signal and wherein each one of said plurality of frequency bands is characterized by a predetermined baud rate and carrier frequency, for example one of: a quadrature amplitude modulated signal (QAM) and a trellis precoded modulated signal.

Where desired, the receiving unit (102) also incorporates devices that compensate for at least one of: frequency offset, timing offset, phase jitter, magnitude jitter, and far and near echoes.

When the equalizer noise power spectrum is determined at a highest available baud rate, the information obtained is generally quite similar to information obtained from an offline line probing SNR spectrum, thus providing an estimated SNR of the channel utilized at least a first selected frequency band.

Time necessary to measure a noise spectrum depends on a desired resolution and measurement variance. For example, for a frequency resolution of 37.5 Hz and a variance of $\frac{1}{8}$ of the noise spectrum, being the resolution and variance of current line probing, a required measurement time is $8^2/37.5 = 1.7$ seconds. Thus, to obtain a same quality in a SNR spectrum estimation as in an off-line line probing, measurement time cannot be reduced. The difference is that the on-line device and method in the present invention utilize one of the modem's training signal and the data signal instead of sending their own line probing signals. Also, by performing the measurement in full duplex, an initial handshake is skipped, and a final handshake is at a higher speed. For example, these initial and final handshakes require about 0.7 seconds in some leased line modem line probing, and usually significantly more time in dial line probing.

In an exemplary implementation, the remote modem and the local modem have baud rate 2400, 2560, 2743, 2954, and 3200, and carrier frequency 1600, 1670, 1745, 1829, and 1920. For different baud rate and carrier frequency combinations, the frequency bands are listed in the following table:

| CARRIER FREQUENCY | BAUD RATE | | | | | FREQ |
|---|---|---|---|---|---|---|
| | 2400 | 2560 | 2743 | 2954 | 3200 | |
| 1600 | 400 | 320 | 229 | | | MIN |
| | 2800 | 2880 | 2971 | | | MAX |
| 1670 | 470 | 390 | 298 | | | MIN |
| | 2870 | 2950 | 3041 | | | MAX |
| 1745 | 545 | 465 | 374 | 269 | | MIN |
| | 2945 | 3025 | 3117 | 3222 | | MAX |
| 1829 | 629 | 549 | 457 | 352 | 229 | MIN |

-continued

| CARRIER FREQUENCY | BAUD RATE | | | | | FREQ |
|---|---|---|---|---|---|---|
| | 2400 | 2560 | 2743 | 2954 | 3200 | |
| | 3029 | 3109 | 3200 | 3305 | 3429 | MAX |
| 1920 | 720 | 640 | 549 | 443 | 320 | MIN |
| | 3120 | 3200 | 3291 | 3397 | 3520 | MAX |

For example, the remote modem may be selected to send a training signal at the default baud rate and carrier frequency 3200/1829. After a receiver is fully conditioned, that is, an equalizer is fully converged and an echo canceller and other compensation loops are in place, a spectrum analyzing unit analyzes the noise power spectrum at the decoder input. This noise power spectrum is utilized to determine the decoder noise power and decoder SNR, and then the maximum supported bit rate for all usable baud rate and carrier frequency combinations. The baud rate and carrier frequency that provides the highest bit rate also provides an optimal baud rate and carrier frequency. The optimal baud rate and carrier frequency are transmitted to the remote modem, and the remote modem typically utilizes the optimal baud rate and carrier frequency next time the remote-local modem pair retrains. The combination 3200/1920 is a special case, and will be selected where, at 3200/1829, a lower band edge noise power density is at least 6 dB different from that of a higher band edge.

Typically a combination 2743/1745 is selected to be the fall-back baud rate and carrier frequency. Where the remote modem receives no indication that training is successful at the default baud rate and carrier frequency 3200/1829 after a predetermined period of time, the remote modem sends the training signal at the fall-back rate and carrier frequency 2743/1745.

In a data mode, the method of the present invention may be utilized to continuously monitor channel variation and to signal a change of baud rate and carrier frequency where such change can significantly improve transmission quality.

The modem may be selected to include a circuit for determining a power level of the training signal and wherein the power level of the training signal is utilized for determining supported bit rates in conjunction with signal-to-noise ratio (SNR). If the power level is very low, the supported bit rates will be lowered.

FIG. 2, numeral 200, is a flow chart diagram that illustrates a first embodiment of the steps of the method of the present invention. The present invention provides a method for selecting communication baud rate and carrier frequency in a system in which a local modem receives information transmitted by a remote device over a first communication channel in the form of a first single carrier modulated signal, the modem being capable of at least receiving the first modulated signal over any one of a first plurality of frequency bands, comprising the steps of: sending a training signal from the remote device to the local modem over the first communication channel(202); receiving the training signal in the local modem (LM)(204); determining information (INFO) for estimating (EST) a signal-to-noise ratio (SNR) and a supported bit rate (RATE) for the first communication channel based upon the received training signal (206); and adaptively selecting one of the first plurality of frequency bands based upon the information for estimating the SNR and the supported bit rate for the first communication channel, said selected one of the first plurality to be communicated to the remote device as a desired band for further transmission to the modem (208). Alternatively, training signals may be replaced by single carrier modulated data signals.

Typically the information for estimating a SNR and a bit rate is substantially an estimated equalizer noise power spectrum, and the modem transmits data to the remote device over a second communication channel by using a second single carrier modulated signal and being capable of sending the second signal over any one of a second plurality of frequency bands, the method further comprising the steps of: transmitting a second training signal from the local modem to the remote device over the second communication channel; receiving the second training signal in the remote device; determining information for estimating a SNR and a supported bit rate for the second communication channel based upon the received second training signal; and selecting one of the second plurality of frequency bands based upon the information for estimating the SNR and the supported bit rate for the second communication channel, said selected one of the second plurality to be communicated to the modem as a desired band for further transmission to the remote device.

Although exemplary baud rate/carrier frequencies, thresholds, and the like are described above, it will be obvious to those skilled in the art that many alterations and modifications may be made without departing from the invention. Accordingly, it is intended that all such alterations and modifications be included within the spirit and scope of the invention as defined in the appended claims.

I claim:

1. A device for at least receiving at least a single-carrier modulated signal transmitted from a remote device utilizing at least one baud/carrier frequency over at least a first communication channel, comprising at least:
   (A) a receiving means, operably coupled at least to the first communication channel, for receiving the single-carrier modulated signal transmitted by the remote device over any one of a plurality of frequency bands;
   (B) a filtering means, operably coupled to the receiving means, for at least providing a demodulated equalized received signal;
   (C) an output symbol determiner, operably coupled to the filtering means, for at least determining output symbols for the equalized received modulated signal;
   (D) a spectrum analyzing means, operably coupled to the filtering means and to the output symbol determiner, for at least utilizing the demodulated equalized received modulated signal and the output symbols for estimating at least one of a signal-to-noise ratio (SNR) spectrum and a noise power spectrum; and
   (E) a baud rate/carrier decision selecting means, operably coupled at least to the spectrum analyzing means, for utilizing information from the spectrum analyzing means for estimating at least one of: decoder signal-to-noise ratios (SNRs), maximum supported bit rates, and SNRs at band edges for at least some of the available baud rate and carrier frequency combinations to select adaptively a desired baud rate and carrier frequency selection in a data communication channel.

2. The device of claim 1 wherein the baud rate/carrier decision selecting means further includes determination of SNR band edge differences, and utilizes a predetermined threshold SNR band edge difference to provide adaptive selection of a desired baud rate and a selected carrier frequency.

3. The device of claim 1 wherein the single-carrier modulated signal is a linearly modulated signal and wherein each one of said plurality of frequency bands is characterized by a predetermined baud rate and carrier frequency.

4. The device of claim 1 wherein a carrier frequency of each one of said plurality of frequency bands is zero.

5. The device of claim 1 wherein the single carrier modulated signal is a quadrature amplitude modulated signal.

6. The device of claim 1 wherein the single carrier modulated signal is a trellis precoded modulated signal.

7. The device of claim 1 wherein the single-carrier modulated signal is compensated for at least one of: frequency offset, timing offset, phase jitter, magnitude jitter, and far and near end echos.

8. The device of claim 1 wherein the filtering means comprises at least an adaptive filter.

9. The device of claim 1 wherein the filtering means implements at least part of trellis precoding.

10. The device of claim 1 wherein the spectrum analyzing means further determines an estimated signal-to-noise ratio of the channel utilized at at least a first selected frequency band.

11. The device of claim 1 wherein the signal received by the receiving means comprises a training signal.

12. The device of claim 1 wherein the spectrum analyzing means that substantially determines at least some noise correlation coefficients:
   takes a difference between the equalized received modulated signals and the output symbols to form noise samples;
   estimates noise power spectrum from the noise samples, typically utilizing discrete Fourier transform (DFT);
   determines signal power spectrum, typically known;
   determines at least some noise correlation coefficients, typically utilizing an inverse discrete Fourier transform (IDFT) over a selected frequency band; and
   determines decoder signal-to-noise ratios for at least some of the baud rate/carrier frequency combinations.

13. The device of claim 12 wherein the spectrum analyzing means utilizes the noise correlation coefficients to determine a precoding gain and decoder signal-to-noise ratios for at least some of the baud rate/carrier frequency combinations in a trellis precoded data transmission system.

14. A device capable of being utilized in a modem that is capable of utilizing at least one baud rate/carrier frequency in a receiver, for at least receiving at least a single carrier modulated signal for information transmitted from a remote device, over at least a first communication channel, comprising at least:
   (A) a receiving means, operably coupled at least to the first communication channel, for receiving a single carrier modulated signal and for receiving a training signal transmitted by the remote device over any one of a plurality of frequency bands;
   (B) a filtering means, operably coupled to the receiving means, for at least providing a demodulated equalized received signal;

(C) an output symbol determiner, operably coupled to the filtering means, for at least determining output symbols for the equalized received modulated signal;

(D) a spectrum analyzing means, operably coupled to the filtering means and to the output symbol determiner, for at least utilizing the equalized received modulated signals and the output symbols for estimating at least one of a signal-to-noise ratio (SNR) spectrum and a noise power spectrum; and (E) a baud rate/carrier decision selecting means, operably coupled at least to the spectrum analyzing means, for utilizing information from the spectrum analyzing means for estimating at least one of: decoder signal-to-noise ratios (SNRs), maximum supported bit rates, and SNRs at band edges for at least some of the available baud rate and carrier frequency combinations to select adaptively a desired baud rate and carrier frequency selection for the first communication channel.

15. The device of claim 14 further including determination of SNR band edge differences, and utilization of a predetermined threshold SNR band edge difference to provide adaptive selection of a desired baud rate and a selected carrier frequency.

16. The device of claim 14 wherein the single-carrier modulated signal is a linearly modulated signal and wherein each one of said plurality of frequency bands is characterized by a predetermined baud rate and carrier frequency.

17. The device of claim 14 wherein a carrier frequency of each one of said plurality of frequency bands is zero.

18. The device of claim 14 wherein the single carrier modulated signal is a quadrature amplitude modulated signal.

19. The device of claim 14 wherein the single carrier modulated signal is a trellis precoded modulated signal.

20. The device of claim 14 wherein the single-carrier modulated signal is compensated for at least one of: frequency offset, timing offset, phase jitter, magnitude jitter, and far and near end echos.

21. The device of claim 14 wherein the filtering means comprises at least an adaptive filter.

22. The device of claim 14 wherein the filtering means implements at least part of trellis precoding.

23. The device of claim 14 wherein the spectrum analyzing means further determines an estimated signal-to-noise ratio of the channel utilized at at least a first selected frequency band.

24. The device of claim 14 wherein the signal received by the receiving means is a training signal that may be replaced, when desired, by a single carrier modulated data signal.

25. The device of claim 14 wherein the modem utilizing the desired baud rate/carrier frequency selection communicates said carrier frequency selection as a desired band for further transmission.

26. The device of claim 14 wherein the spectrum analyzing means that substantially determines at least some noise correlation coefficients:
   takes a difference between the equalized received modulated signals and the output symbols to form noise samples;
   estimates noise power spectrum from the noise samples, typically utilizing discrete Fourier transform (DFT);
   determines signal power spectrum, typically known;
   determines at least some noise correlation coefficients, typically utilizing an inverse discrete Fourier transform (IDFT) over a selected frequency band; and
   determines decoder signal-to-noise ratios for at least some of the baud rate/carrier frequency combinations.

27. The device of claim 26 wherein the spectrum analyzing means utilizes the noise correlation coefficients to determine a precoding gain and decoder signal-to-noise ratios for at least some of the baud rate/carrier frequency combinations in a trellis precoded data transmission system.

28. A method for selecting a baud rate and carrier frequency in a system in which a local device communicates with a remote device over a first communication channel utilizing single carrier modulation, wherein the local device and the remote device are single-carrier modulated for a system capable of at least receiving the first modulated signal over any one of a first plurality of frequency bands, comprising the steps of:

(A) sending a training signal from the remote device to a local device over the first communication channel;

(B) receiving the training signal in the local device;

(C) determining information for estimating at least one of: signal-to-noise ratio (SNR) spectrum and noise power spectrum for the first communication channel based upon the received training signal and output symbols from an output symbol determiner; and (D) adaptively selecting one of the first plurality of frequency bands based upon the information for estimating the SNR spectrum for the first communication channel, said selected one of the first plurality of frequency bands to be communicated to the remote device as a desired band for further transmission to the device.

29. The method of claim 28, wherein the information for estimating a SNR is substantially an estimated equalizer noise power spectrum.

30. The method of claim 29 wherein at least some noise correlation coefficients are determined from the estimated noise power spectrum.

31. The method of claim 30 wherein the noise correlation coefficients are substantially determined by an inverse discrete Fourier transform (DFT) over a selected frequency band.

32. The method of claim 28 wherein the noise power spectrum is utilized to determine SNRs at band edges for at least some baud rate and carrier frequency combinations.

33. The method of claim 32 further including determination of SNR band edges and differences between SNR band edges, and utilization of a predetermined threshold SNR band edge difference to provide adaptive selection of a desired baud rate and carrier frequency.

34. The method of claim 28 wherein the local device (modem) further transmits information to the remote device (modem) over a second communication channel by using a second single carrier modulated signal and being capable of sending the second signal over any one of a second plurality of frequency bands, the method further comprising the step of:
   transmitting a second training signal from the local device to the remote device over the second communication channel to provide the second training signal to the remote device for enabling the remote modem to determine information for estimating at least one of: signal-to-noise (SNR) spectrum and noise power spectrum for the second communication channel based upon the received second training signal and the output symbols from the output symbol determiner; and to adaptively select one of the second plurality of frequency bands based upon the information for estimating the SNR spectrum for the second communication channel, said selected one of the second plurality of frequency bands to be communicated to the device as a desired band for further transmission to the remote device.

35. The method of claim 28, wherein training signals are replaced by single carrier modulated data signals.

36. A method for selecting a communication baud rate and carrier frequency in a system in which a local device communicates with a remote device over a first communication channel in the form of a first single carrier modulated signal, the system being capable of at least receiving the first modulated signal at any one of a first plurality of bit rates, comprising the steps of:

(A) sending a training signal from the remote device to the local device over the first communication channel;

(B) receiving the training signal in the local device;

(C) determining information for estimating at least one of: signal-to-noise (SNR) spectrum and noise power spectrum for the first communication channel based upon the received training signal and the output symbols from the output symbol determiner; and (D) selecting one of the first plurality of bit rates based upon the information for estimating the SNR spectrum for the first communication channel, said selected one of the first plurality of bit rates to be communicated to the remote device as a desired bit rate for further transmission to the device.

37. The method of claim 36 wherein the information for estimating a SNR is substantially an estimated equalizer noise power spectrum.

38. The method of claim 37 wherein at least some noise correlation coefficients are determined from the estimated noise power spectrum.

39. The method of claim 38 wherein the noise correlation coefficients are substantially determined by an inverse discrete Fourier transform (DFT) over a selected frequency band.

40. The method of claim 39 wherein the noise power spectrum is utilized to determine SNRs at band edges for at least some baud rate and carrier frequency combinations.

41. The method of claim 40 further including determination of SNR band edges and differences between SNR band edges, and utilization of a predetermined threshold SNR band edge difference to provide adaptive selection of a desired baud rate and carrier frequency.

42. The method of claim 36 wherein the local device (modem) further transmits information to the remote device (modem) over a second communication channel by using a second single carrier modulated signal and being capable of sending the second signal at any one of a second plurality of bit rates, the method further comprising the step of:

transmitting a second training signal from the local device to the remote device over the second communication channel to provide the second training signal to the remote device for enabling the remote modem to determine information for estimating a SNR for the second communication channel based upon the received second training signal; and to select one of the second plurality of bit rates based upon the information for estimating the SNR for the second communication channel, said selected one of the second plurality of bit rates to be communicated to the device as a desired bit rate for further transmission to the remote device.

* * * * *